(12) United States Patent
Holleschau et al.

(10) Patent No.: US 10,622,794 B1
(45) Date of Patent: Apr. 14, 2020

(54) ELECTRICAL GANG BOX WITH INTEGRATED DRIVER

(71) Applicant: Elemental LED, Inc., Reno, NV (US)

(72) Inventors: Randall Holleschau, Reno, NV (US); Adam L. Pruitt, Reno, NV (US); Daniel South, Dayton, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 16/394,698

(22) Filed: Apr. 25, 2019

(51) Int. Cl.
*H02G 3/08* (2006.01)
*H01H 9/00* (2006.01)
*H05B 45/37* (2020.01)

(52) U.S. Cl.
CPC .......... *H02G 3/085* (2013.01); *H01H 9/0044* (2013.01); *H05B 45/37* (2020.01)

(58) Field of Classification Search
CPC .......... H02G 3/08; H02G 3/081; H02G 3/085; H02G 3/086; H02G 3/10; H01H 9/0044; H01H 9/02; H05B 33/0815; H01R 13/46; H01R 13/53; H05K 5/00; H05K 5/02; H05K 5/0204; H05K 5/0217; H05K 5/04
USPC ... 174/499, 50, 480, 481, 503, 520, 535, 53, 174/58, 59, 60; 220/3.2–3.9, 4.02; 361/600, 601
See application file for complete search history.

(56) References Cited

U.S. PATENT DOCUMENTS

| | | | |
|---|---|---|---|
| 3,690,501 A * | 9/1972 | Ware | H02G 3/086 174/57 |
| 5,472,355 A | 12/1995 | Wittmann | |
| 5,486,650 A | 1/1996 | Yetter | |
| 5,594,207 A | 1/1997 | Fabian et al. | |
| 5,596,174 A * | 1/1997 | Sapienza | H02G 3/086 174/53 |
| 5,962,811 A | 10/1999 | Rodrigues et al. | |
| 6,037,541 A | 3/2000 | Bartley et al. | |
| 6,091,023 A * | 7/2000 | O'Donnell | H02G 3/086 174/57 |
| 6,362,987 B1 | 3/2002 | Yurek et al. | |

(Continued)

FOREIGN PATENT DOCUMENTS

DE 19501339 C1 8/1996
WO WO1998023015 A1 5/1998

OTHER PUBLICATIONS

Elemental LED: "Switchex." Diode LED (2016): 78-79. 2016. Web.
(Continued)

*Primary Examiner* — Angel R Estrada
(74) *Attorney, Agent, or Firm* — United IP Counselors, LLC (57) ABSTRACT

Assemblies are disclosed that allow a driver to be mounted in association with an electrical gang box. In one embodiment, the gang box has an opening in a bottom panel. The driver has a flange that is larger than the opening and a body that is smaller than the opening. The driver is inserted through the opening so that the flange rests on the interior surface of the bottom panel with at least a majority of the body of the driver extending outside of the gang box. In another embodiment, the gang box has an opening in a side or rear panel and an adapter mounts the driver outside of the gang box. These assemblies allow for the use of low-voltage and other types of electrical components while leaving space in the gang box for conventional electrical elements, such as switches and dimmers.

15 Claims, 10 Drawing Sheets

(56) References Cited

U.S. PATENT DOCUMENTS

| | | | |
|---|---|---|---|
| 6,395,981 B1 | 5/2002 | Ford et al. | |
| 6,595,381 B1 | 7/2003 | Johnson | |
| 7,439,442 B2* | 10/2008 | Schutte | F21V 15/01 |
| | | | 174/50 |
| 7,499,261 B2 | 3/2009 | Hash | |
| 7,952,022 B2* | 5/2011 | Rippel | H02G 3/125 |
| | | | 174/50 |
| 7,988,332 B2 | 8/2011 | Lo et al. | |
| 8,049,107 B2* | 11/2011 | Dinh | H02G 3/18 |
| | | | 174/50 |
| 8,436,259 B2 | 5/2013 | Green et al. | |
| 8,459,812 B2 | 6/2013 | Wu et al. | |
| 8,739,997 B1* | 6/2014 | Ploof | H02G 3/14 |
| | | | 174/50 |
| 9,239,136 B1 | 1/2016 | Petersen et al. | |
| 9,279,544 B1 | 3/2016 | Dankelmann et al. | |
| 9,788,374 B1 | 10/2017 | Holleschau et al. | |
| 9,951,934 B2* | 4/2018 | Buck | H02G 3/088 |
| 10,028,340 B2 | 7/2018 | Archer | |
| 10,116,127 B1 | 10/2018 | Lopez-Martinez et al. | |
| 10,349,476 B2* | 7/2019 | Holleschau | H05B 33/0815 |
| 2003/0056964 A1 | 3/2003 | Lalancette et al. | |
| 2003/0102143 A1 | 6/2003 | Sato et al. | |
| 2006/0191697 A1 | 8/2006 | Cardenas et al. | |
| 2007/0182338 A1 | 8/2007 | Shteynberg et al. | |
| 2008/0105461 A1 | 5/2008 | King et al. | |
| 2009/0065247 A1 | 3/2009 | Shelton et al. | |
| 2010/0052577 A1 | 3/2010 | Brownlee | |
| 2010/0088901 A1 | 4/2010 | Glancey et al. | |
| 2012/0139745 A1 | 6/2012 | Makwinski | |
| 2012/0292991 A1 | 11/2012 | Dodal et al. | |
| 2013/0258682 A1 | 10/2013 | Pino et al. | |
| 2013/0294041 A1 | 11/2013 | Syal | |
| 2013/0319715 A1 | 12/2013 | Korcz et al. | |
| 2014/0312776 A1 | 10/2014 | Park et al. | |
| 2014/0375897 A1 | 12/2014 | Sugiura | |
| 2015/0362164 A1 | 12/2015 | Levante et al. | |
| 2016/0006202 A1 | 1/2016 | Dupuis et al. | |
| 2017/0367158 A1 | 12/2017 | Petersen et al. | |
| 2019/0063737 A1 | 2/2019 | Buck et al. | |

OTHER PUBLICATIONS

European Patent Office, Partial Search Report for PCT/US2017/035039, dated Jul. 25, 2017.

Elemental LED, Inc. "SWITCHEX." 2016 Diode LED catalog, pp. 78-79, Jan. 2016.

Elemental LED, Inc. "Lo-Pro Junction Box." 2016 Diode LED catalog, pp. 1 and 85, Jan. 2016.

International Search Report and Written Opinion of the International Searching Authority for PCT/US2017/022129, filed Mar. 13, 2017. Report dated Jun. 19, 2017.

* cited by examiner

ELECTRICAL GANG BOX WITH INTEGRATED DRIVER

BACKGROUND OF THE INVENTION

1. Field of the Invention

The invention relates to electrical junction boxes, and particular, to electrical junction boxes adapted to be integrated with drivers.

2. Description of Related Art

Household and commercial lighting based on light-emitting diodes (LEDs) has overtaken incandescent and fluorescent fixtures in the marketplace, rendering them nearly obsolete. While the emergence of LED lighting has resulted in greater energy efficiency, better light quality, and more creative lighting options, LED lighting does have its challenges.

One of those challenges is power. Most traditional household and commercial luminaires use high-voltage, alternating current (AC) power, typically at line voltage. In the United States, residential line voltage is 120V; commercial and industrial line voltages are higher. Most LED lighting operates using low-voltage, direct current (DC) power. While the definitions of high voltage and low voltage vary depending on the authority one consults, for purposes of this description, voltages over about 50V will be considered high voltage. LED lighting typically operates at, e.g., 12V or 24V DC, although higher voltages are sometimes used.

A driver is an electrical component that converts power into a form suitable for use with LED lighting. Typically, a driver converts high-voltage AC power to low-voltage DC power, although other types of drivers, including those meant for DC-to-DC conversion, may be used. The most common type of driver is a switched-mode power supply that transforms, rectifies, and filters incoming high-voltage AC power to convert it to low-voltage DC power. Drivers are becoming ubiquitous—and are ubiquitously disliked. Depending on the amount of power that it is intended to handle, a driver can be large, and whether large or small, a driver is one more element that a lighting design must accommodate. Proper driver installation can require additional ingress and egress points created in walls, additional wires pulled through walls, and more trouble for the installer. After initial installation, drivers are often the first components to fail in an LED-based lighting system, and installing replacement drivers can require significant labor.

U.S. Pat. No. 9,788,374, which is incorporated by reference in its entirety, suggests a possible solution to the problem—using a multi-compartment gang box to hold both a driver and a lighting control element. A "gang box" is the generic name for an enclosure that contains lighting or electrical control elements and provides space for the electrical connections that they require. A gang-box is classified according to the number of standard-sized compartments it provides, e.g., a one-gang box, a two-gang box, etc. Gang boxes may contain switches, dimmers, electrical outlet receptacles, and even some types of sensors, and are essentially junction boxes for these components. The '374 patent discloses that the compartment in which the driver is placed may be covered with a nonfunctional decorative element or with a switch or other element that controls the driver.

The solution offered by this patent has many advantages, including the ability to use familiar electrical elements and the ability to use an LED driver with a conventional lighting control. However, the issue is one of size: gang boxes have compartments with defined and limited sizes, and there are only a few drivers currently on the market that are small enough to fit into the available space. (As one example, U.S. Pat. No. 10,028,340, the contents of which are incorporated by reference in their entirety, discloses a driver/control combination capable of fitting into a one-gang box.) While a large, multi-compartment gang box might fit most drivers, more elegant solutions would be helpful.

SUMMARY OF THE INVENTION

Aspects of the invention relate to parts and assemblies that allow a driver to be mounted in association with a gang box while leaving substantially the entirety of the interior volume of a gang box free for conventional electrical elements. Depending on the embodiment, the driver may be mounted in such a way that substantially the entirety of its volume lies outside the gang box when it is mounted, or the driver may be mounted in such a way that it is entirely outside of the gang box, with only an adapter or other securing structure entering the gang box. The assemblies typically include at least a gang box and a driver, and may also include an electrical element, such as a switch or dimmer.

According to one aspect of the invention, a gang box has either an opening or a knock-out for an opening in a bottom panel. A driver has a body sized to fit through the opening and a flange attached to one face that is larger than the opening in at least one dimension. The driver body is inserted through the opening so that the flange rests on the inner surface of the bottom panel. In this configuration, substantially the entirety of the volume of the driver sits outside the gang box. The driver has a set of inputs and a set of outputs, typically either wires or terminals, that enter the gang box to make connections. In some embodiments, the gang box may carry a pair of inwardly-extending flanges on opposite interior sidewalls, proximate to the bottom panel. A spacer may fit between the flanges and the flange of the driver in order to secure the driver.

According to another aspect of the invention, a gang box has either an opening or a knock-out for an opening in a sidewall, top wall, or rear wall. A driver has a set of inputs and a set of outputs and is attached to an adapter. The adapter has first and second parts that secure the driver to the gang box using the opening. The first part may be, for example, a channel that fits over a lower edge of the opening to mount the driver. The second part may be, for example, a forwardly-extending projection that enters the gang box and abuts an upper interior surface to secure the driver.

Other aspects, features, and advantages of the invention will be set forth in the following description.

BRIEF DESCRIPTION OF THE DRAWING FIGURES

The invention will be described with respect to the following drawing figures, in which like numerals represent like features throughout the invention, and in which.

DETAILED DESCRIPTION

Figure 1:
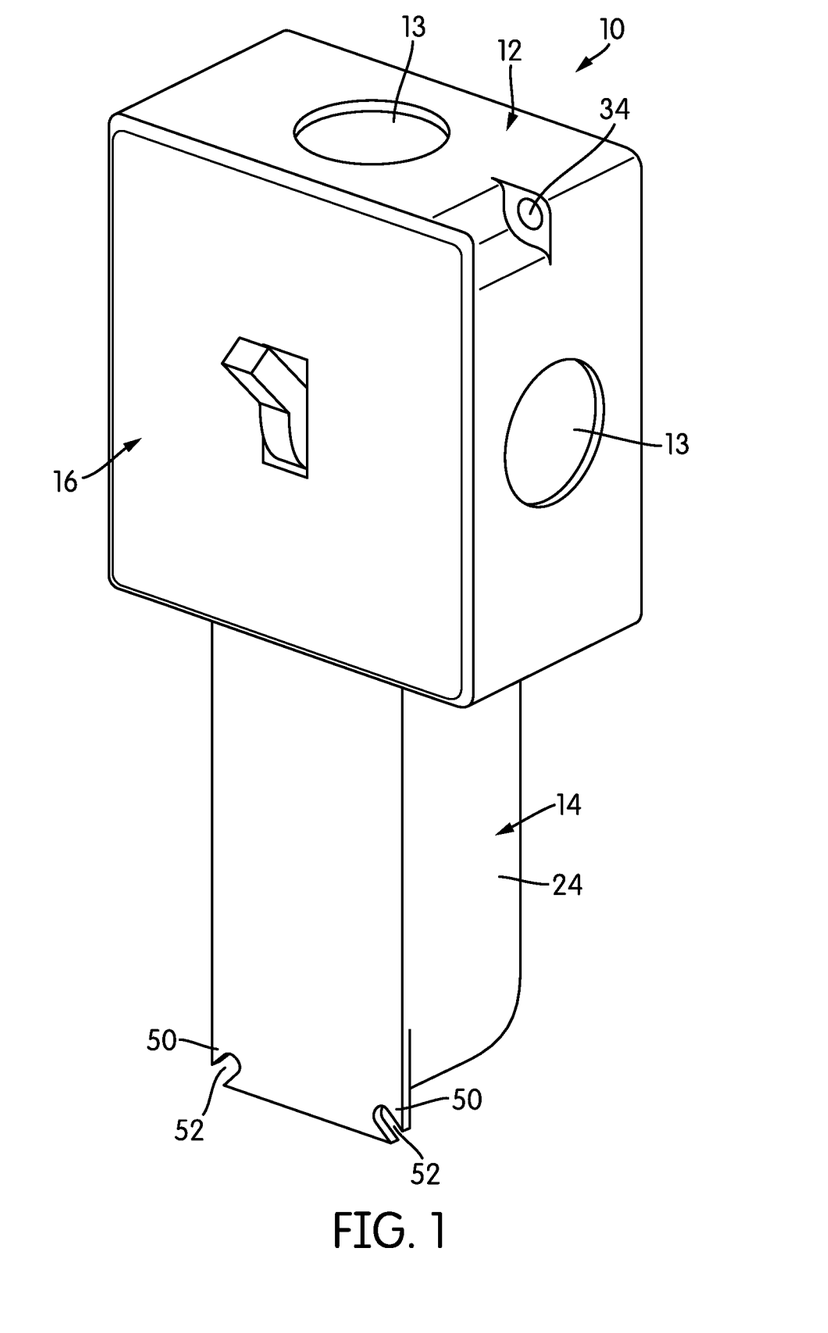
FIG. 1 is a perspective view of an assembly including a gang box, a driver, and an electrical element according to one embodiment of the invention.
Figure 2:
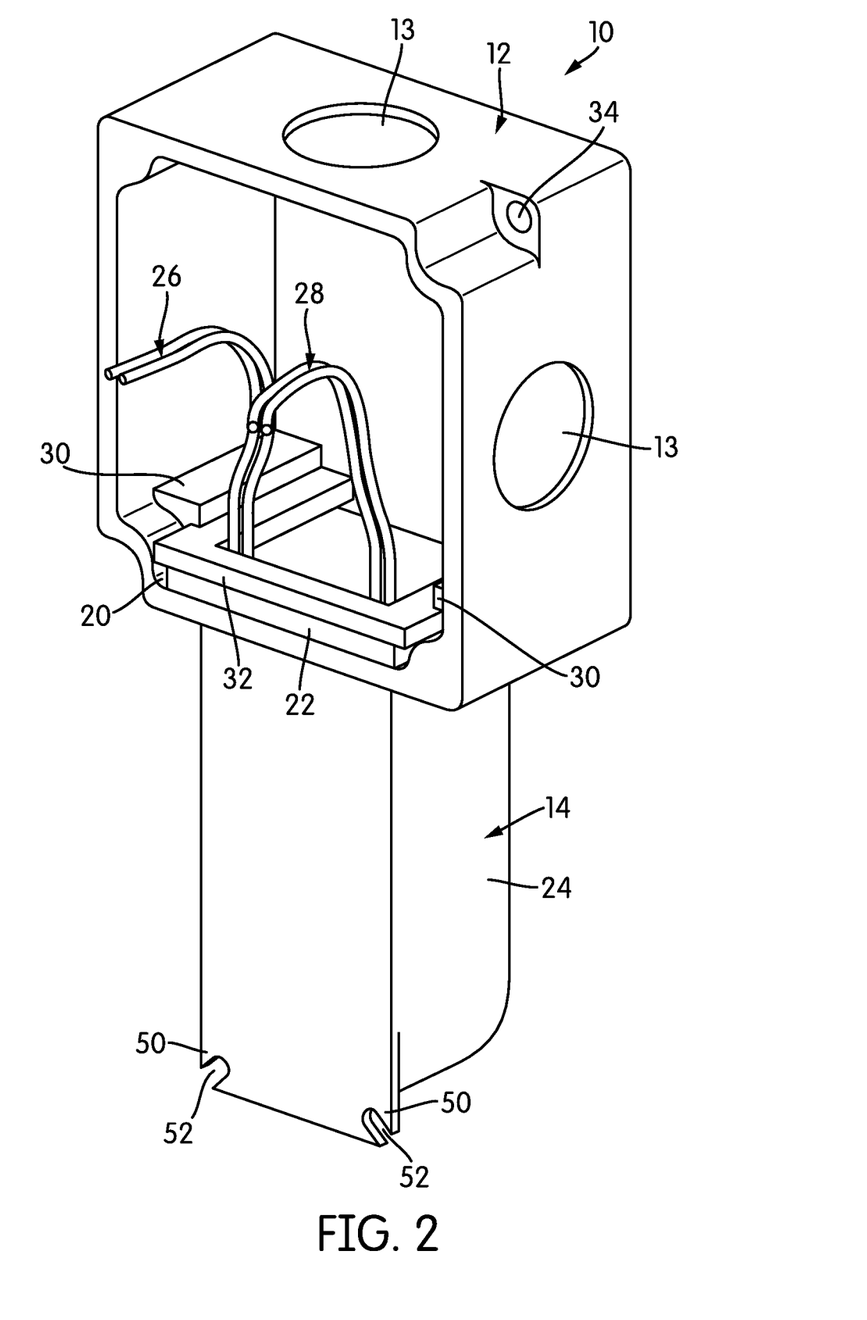
FIG. 2 is a perspective view of the assembly of FIG. 1 with the electrical element removed.

FIG. 1 is a perspective view of an assembly, generally indicated at 10, that includes a gang box 12, a driver 14, and an electrical element 16, and FIG. 2 is a perspective view of the gang box 12 and driver 14 with the electrical element 16 removed. Here, the term "electrical element" is a general term referring to anything that one of skill in the art might place in a gang box. Electrical elements include, but are not limited to, switches, dimmers, sensors (such as occupancy and motion sensors), color controllers, network interfaces, and home or building automation interfaces. Moreover, although certain portions of this description may assume that the electrical element 16 operates using high-voltage AC power, some electrical elements may operate using low-voltage DC power, for example, some sensors, and some inline dimmers.

In the illustrated embodiment, the electrical element 16 is a switch, although the nature of the electrical element 16 is not critical, and in other embodiments, it may be of any type. What is notable is that both the electrical element 16 and the gang box 12 are of standard size. In the assembly 10 of FIG. 1, a driver 14 is associated with and mounted in the gang box 12 while leaving at least the majority of the space within the gang box 12 open for the installation of the electrical element 16. In some cases, almost all of the interior volume of the gang box 12 may be open for installation of the electrical element 16.

More specifically, as can be seen in FIG. 2, in order to mount the driver 14 within the gang box 12, both elements 12, 14 are modified somewhat from their standard form. An opening 18 is formed in a sidewall, top, or bottom of the gang box 12. In the view of FIG. 2, that opening 18 is formed in the bottom panel 20 of the gang box 12, although the opening 18 may be in the top panel, the back panel, or either side panel, as will be explained below in more detail. The opening 18 may be formed when the gang box 12 is manufactured, or it may be formed at some later point. For example, one or more walls of the gang box 12 may have frangible portions (also called knock-outs) that can be broken out to form an opening 18, and an installer may thus be able to select which wall to break out at the time of installation. If frangible portions are not provided, the gang box 12 may be inscribed or marked with lines that can be cut or pierced manually to form the opening. Alternatively, gang boxes 12 with pre-existing openings 18 in specific walls may be available for purchase.

As those of skill in the art will realize, gang boxes typically already include at least a set of small knock-outs, usually round, in order to allow ingress and egress of wiring. In the illustrated embodiment, the gang box 12 includes round knock-outs 13 centered in one side face and its top face, although other arrangements may be used. In some cases, the gang box 12 may include a rectangular or substantially rectangular knock-out for the opening 18 and smaller knock-outs within the area of the rectangular knock-out in case the installer does not want a rectangular opening on a particular wall, but does want smaller, round openings to pass wires.

As shown, the driver 14 has a flange 22. That flange 22 is larger than the opening 18 in at least one dimension, either width or depth, and may be the same size as the wall of the gang box 12, or it may be slightly smaller. The body 24 of the driver 14 depends from the flange 22, such that the body 24 of the driver 14 is sized to fit through the opening 18 while the flange 22 is not. Thus, when the driver 14 is installed in the gang box 12, the body 24 of the driver 14 protrudes from the opening 18 and lies outside the walls of the gang box 12. In the illustrations of FIGS. 1 and 2, because the opening 18 is in the bottom of the gang box 12, the body 24 extends downwardly through the opening 18. However, other orientations are possible and will be described below in more detail. As shown, the majority of the body 24 of the driver 14 rests outside the gang box 12.

The driver 14 of the illustrated embodiment has a set of inputs and a set of outputs, in this case an input set of wires 26 and an output set of wires 28. Both the input set of wires 26 and the output set of wires 28 protrude through the top of the flange 22, so that they are within the gang box 12 when the driver 14 is installed. The input set of wires 26 of this embodiment accepts high-voltage AC power, and the output set of wires 28 outputs low-voltage DC power. The driver 14 may have any number of sets of wires, and each set may include any number of wires. In the United States, the input set of wires 26 would typically include a live wire (coded black), a neutral wire (coded white) and a ground wire (coded green). The output set of wires 28 typically includes a positive wire (coded red) and a neutral wire (coded blue). The driver 14 may also have a set of dimming control wires that provide an input voltage signal to control dimming, e.g., using a 0-10V dimming scheme. Those dimming control wires would also protrude into the gang box 12. The position of the sets of wires 26, 28 is not critical, although it may be helpful if the sets of wires 26, 28 protrude toward the rear of the gang box 12, so as to make connections with the rear of the electrical element 16.

Some drivers come with both input and output wires protruding from one side or end face, as does the driver 14, and these drivers may be particularly suited to be used as shown in FIGS. 1 and 2. Other drivers may have an input set of wires that extend from one face and an output set of wires that extend from another face. In that case, one set of wires could be routed so that they extend in the same direction as the other set of wires and can be arranged as shown in FIG. 2. If one set of wires needs to be routed differently in order to be used as shown in FIG. 2, it may be helpful if those wires are lengthened. Additionally, although sets of wires 26, 28 are shown as the sets of inputs and outputs in FIG. 2, terminal blocks or other means of connection may be used in other embodiments. As used here, the terms "terminal" and "terminal block" refer to electrical connectors that can receive and secure a bare or stripped wire, e.g., with a screw or a spring-biased component. Of course, the inputs and outputs need not be bare wires or terminals for bare wires. A wide variety of connectors are used in the industry, and any input or output described here may be a connector or a socket for such a connector. Particularly useful may be the subset of so-called "tool-less quick connectors," which make a releasable mechanical and electrical connection without the need for tools. In addition to wired, physical inputs and outputs, some drivers 14 may be equipped to accept wireless input and output, for example, to allow the driver 14 to be controlled over a wireless connection, or integrated into a building automation system or wireless Internet of Things (TOT) configuration.

As one example of how the assembly 10 might be used with a switching electrical element 16, when the assembly 10 is installed, a set of supply wires connected to the building electrical supply would typically be connected to the input of the electrical element 16. The output of the electrical element 16, presumably high voltage, would typically be connected to the input set of wires 26 of the driver 14. The output set of wires 28 from the driver 14, presumably low voltage DC, would be connected to a load requiring low-voltage DC power, e.g., an LED luminaire. As another example, if the electrical element 16 is, for example, a low-voltage DC pulse width modulation dimmer, the supply wires from the building electrical supply would be connected directly to the input set of wires 26 of the driver 14. The output set of wires 28 in this example would be connected to the input of the electrical element 16, and the output wires from the electrical element 16 would be connected to the load.

While a driver 14 that converts high-voltage AC power to low-voltage DC power is typical, for purposes of this description, a "driver" should be considered to be any electrical component that receives power in a first form at its inputs and outputs that power in a second form at its outputs. The first form may differ from the second form in one or more of: power type (e.g., AC or DC), voltage, frequency, phase, or any other characteristic. As described above, some drivers may also have additional wires or terminals to provide control signals. Of course, some of the input power is used by the driver 14 or lost during the conversion process. The precise characteristics of any particular driver 14 are not critical.

The driver 14 and the gang box 12 are preferably secured together in some way. For example, the flange 22 may include openings for fasteners to secure it into the bottom face 20 around the opening 18. Alternatively, the underside of the flange 22 may include adhesive. However, it may be helpful if the driver 14 can be secured in the opening 18 without fasteners or adhesive, because these modes of securement either require additional effort (fasteners) or may not be easily reversed (adhesive). Fasteners, adhesive, and other such means of securement over may still be used if the gang box 12 is not specially adapted for a fastenerless connection.

As shown in FIG. 2, the gang box 12 includes structure that is arranged and adapted to secure the driver 14. Specifically, a pair of flanges 30 extend inwardly from opposite interior sidewalls of the gang box 12 near the bottom of the gang box 12, creating a channel. The flanges 30 do not extend out very far; they leave enough clearance so that the driver 14 and its flange 22 can still be dropped straight into the opening. A spacer 32 that is wider than the flange 22 slides in between the flange 22 on the driver 14 and the pair of flanges 30 defined by the gang box 12. The spacer 32 is thick enough to apply force to the flange 22 of the driver 14 when inserted. However, the spacer 32 is also C-shaped in plan view, leaving most of the area of the flange 22, and its sets of wires 26, 28, exposed. The precise shape and extent of the spacer 32 is not critical so long as the spacer 32 allows the sets of wires 26, 28 to pass. In some cases, the spacer 32 may be slightly wedge-shaped when seen in elevational view, so that the pressure on the flange 22 increases as it is inserted.

One advantage of the spacer 32 is that it adapts for different sizes and thicknesses of flange 22. It may also provide a tight fit between components, and may help to comply with regulatory requirements. Different thicknesses of spacer 32 may be used for different types of drivers 14, and a driver 14 intended for use in an assembly 10 may come with its own spacer 32, so that the spacer 32 has the proper dimensions. From a regulatory standpoint, one of the main purposes of an enclosure like the gang box 12 is to contain sparks and fire should there be an electrical fault of some kind within the enclosure. By providing a tight fit between components, the spacer 32 may help in doing so.

Figure 3:
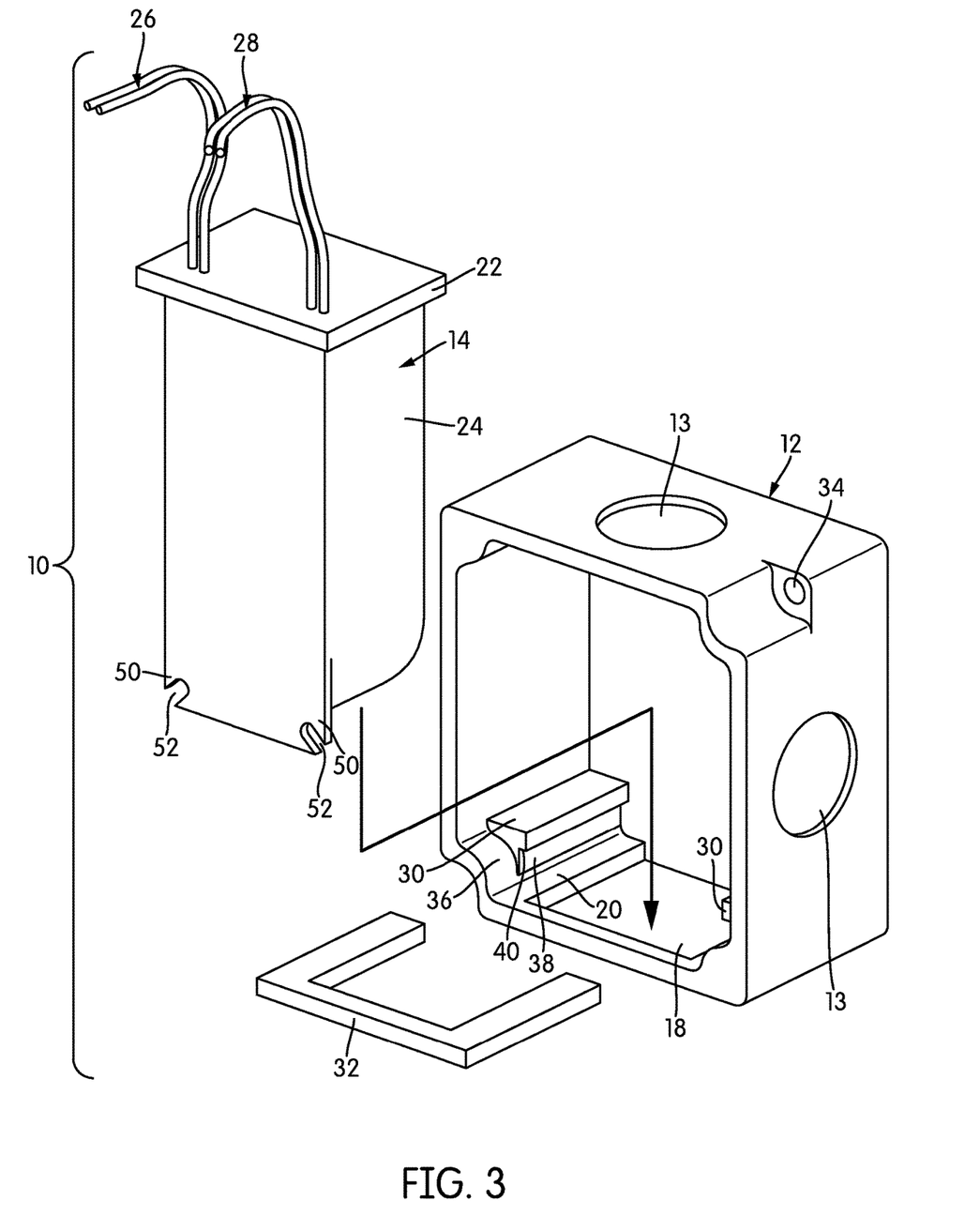
FIGS. 3-5 are a series of exploded perspective and perspective views illustrating the process of assembling the components of the assembly of FIG. 1.
Figure 4:
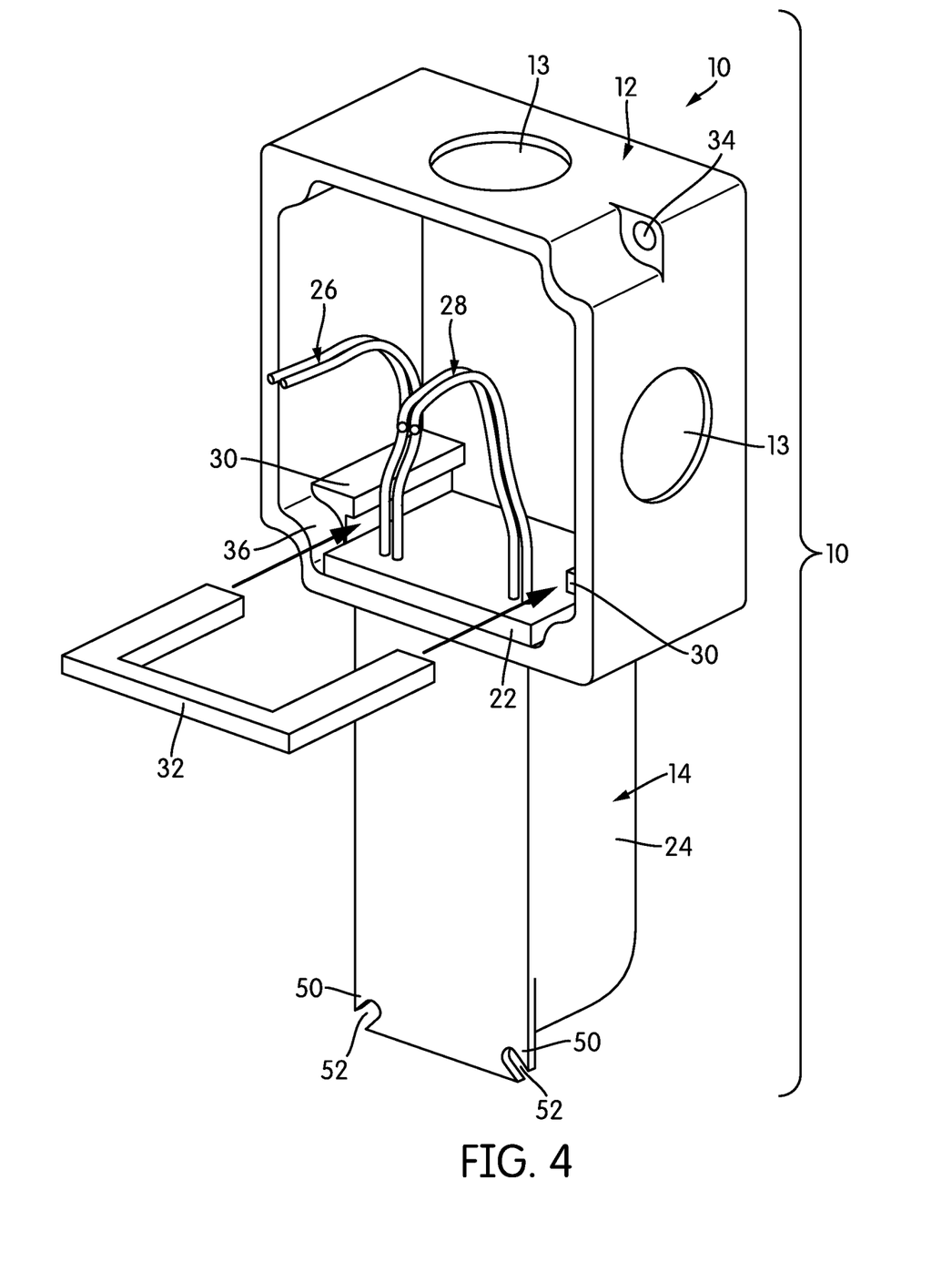
Figure 5:
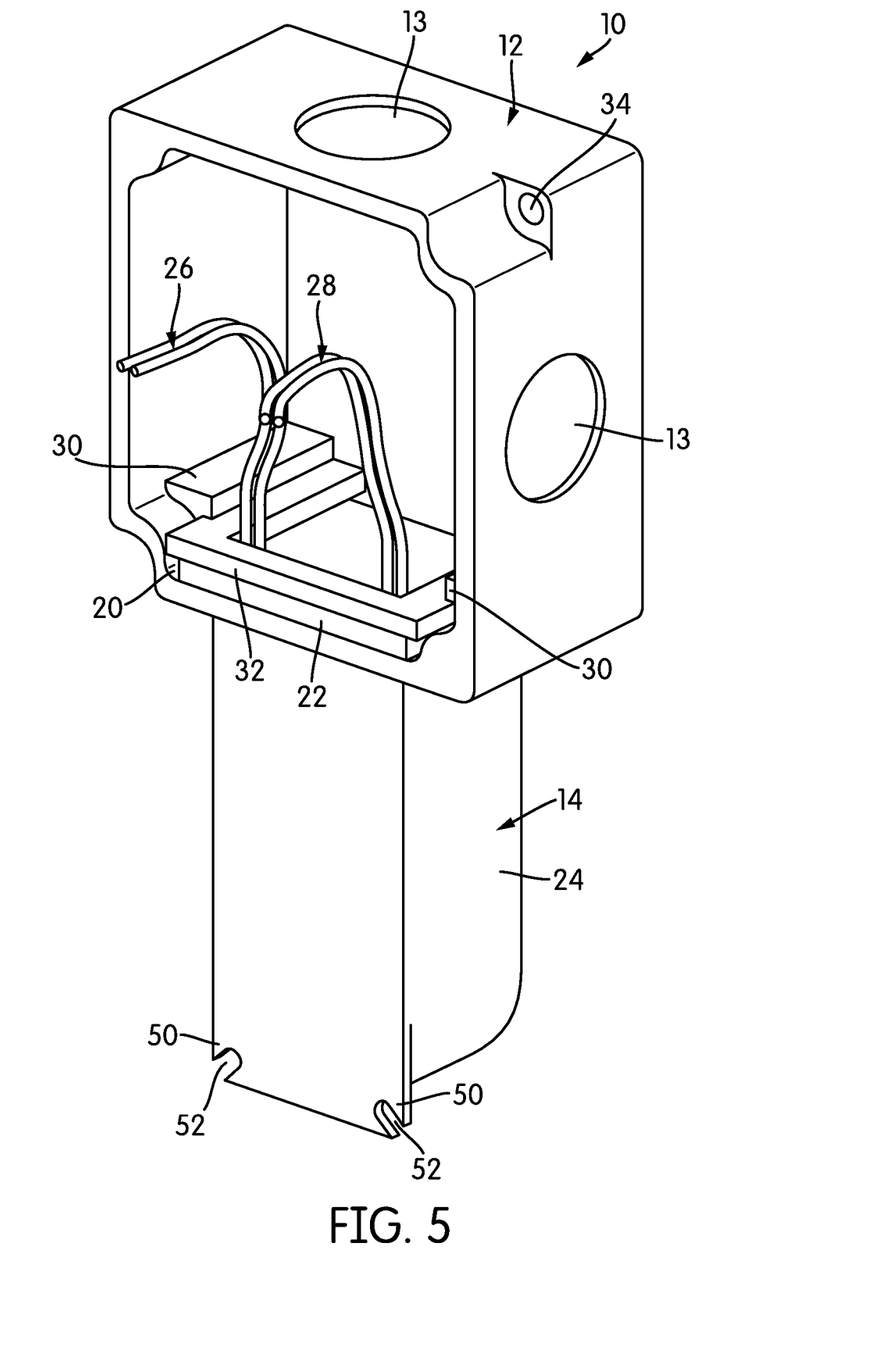

FIGS. 3-5 are perspective views of the assembly 10. FIG. 3 illustrates the three components 12, 14, 16 disassembled, and shows the opening 18 in the bottom panel 20 of the gang box 12. As can also be seen most clearly in FIG. 3, the gang box 12 has all of the typical features of such a structure, including recessed openings 34 at opposite corners that allow the gang box to be mounted to a joist or another structure within a wall. Structure for securing the electrical element 16 in the gang box 12 is not specifically shown in FIGS. 3-5, but any conventional structure may be used.

One of the flanges 30 is also shown clearly in the view of FIG. 3; the other flange 30 is a mirror image. As shown in FIG. 3, the corners of this particular gang box 12 bulge inward, in order to provide room for the recessed openings 34. The flanges 30 arise from that curved interior structure 36 and are rectilinear, featuring a flat, interior-facing side surface 38 that bears against the spacer 32 when the spacer 32 is installed. The underside 40 of each flange 30 is also generally flat in the illustrated embodiment. In some embodiments, however, the surfaces of the flanges 30 may be sloped or act as cams in order to drive the spacer 32 into firmer engagement with the flange 22. The flanges 30 and spacer 32 are optional features; in some embodiments, the electrical element 16 itself may provide sufficient securement.

As shown in FIG. 3, the flanges 30 extend from the rear face 42 of the gang box 12, but do not reach the front of the gang box 12. Rather, they terminate at approximately two-thirds to three-quarters of the depth of the gang box 12. In some embodiments, the flanges 30 may extend the entire depth of the gang box 12, or substantially the entire depth. Not extending that entire depth has an advantage, though: it leaves room for the internal structure of the electrical element 16. In general, the depth of the flanges 30 is not critical, so long as they are of sufficient length to secure the spacer 32.

In the partially-assembled perspective view of FIG. 4, the driver 14 has been dropped into the opening 18 so that much of its body 24 extends down, outside of the gang box 12. Because the height of the gang box 12 may be less than the height of the driver body 24, the opening 18 may be significantly larger than the body of the gang box 12 in order to facilitate insertion of the gang box 12 by angling the driver 14 into the opening 18. The spacer 32 is then slid into place to secure the driver 14. FIG. 5, the fully-assembled perspective view, is identical to FIG. 1, and is presented for the sake of continuity.

The sequence of FIGS. 3-5 illustrate installation of the driver 14 if the opening 18 is bounded on all four sides by the bottom panel 20 of the gang box 12. However, that need not be the case in all embodiments. In some embodiments, instead of an opening 18, there may be a cut-out or knock-out that opens in the front of the gang box 12 and is bounded only along the sides and back by the bottom panel 20. In that case, the driver 14 may be slid into place from the front without having to be dropped into an opening, much as the spacer 32 is slid into place from the front, as shown in FIG. 4.

In some jurisdictions, regulatory standards may require a physical barrier between wires that carry high-voltage power and wires that carry low-voltage power. Because assemblies 10 according to embodiments of the invention are often intended to convert high-voltage AC to low-voltage DC, a physical barrier may be required between the high-voltage and low-voltage wires.

Figure 6:
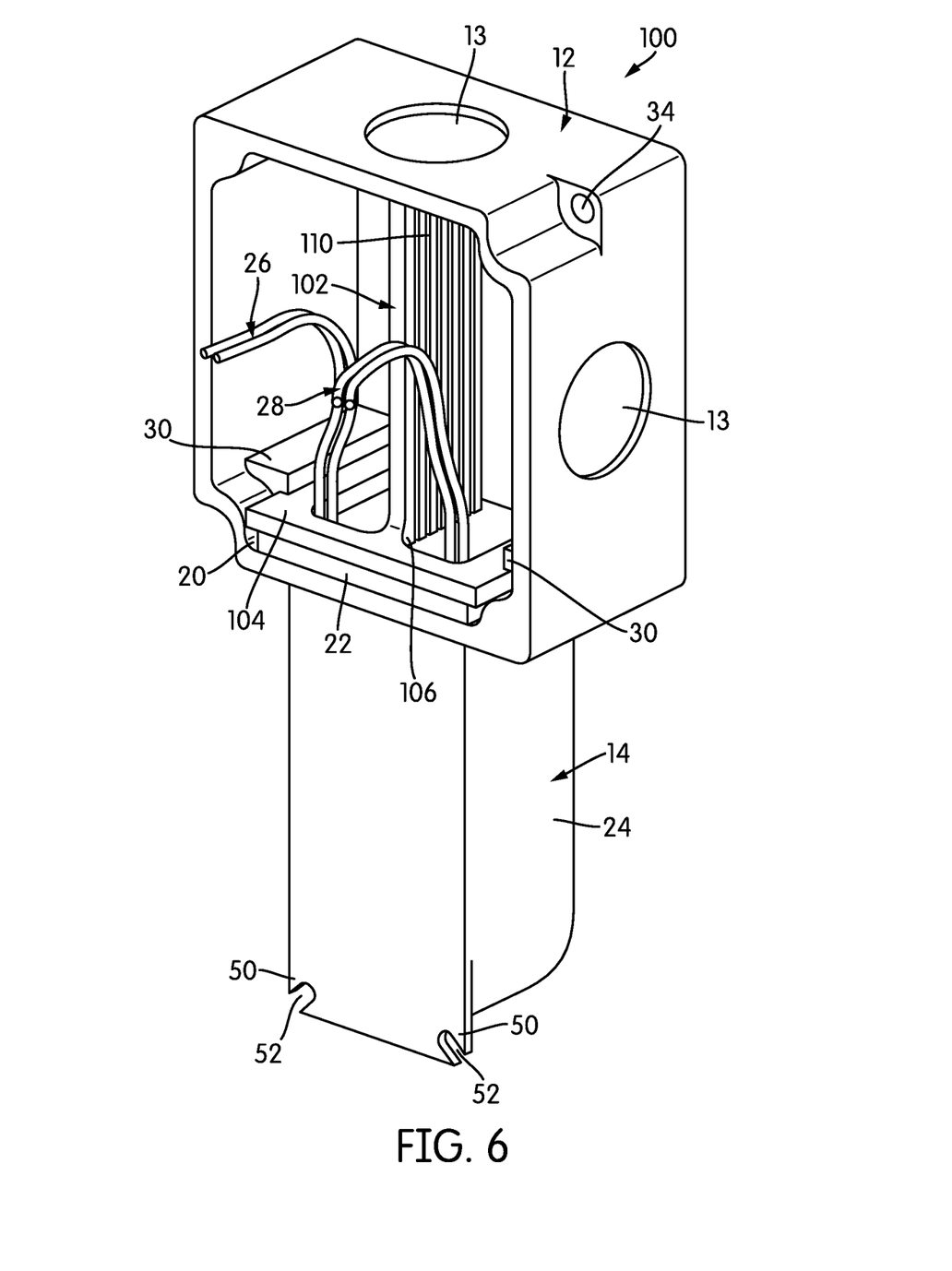
FIG. 6 is a perspective view of an assembly according to another embodiment of the invention that includes a physical barrier to separate high-voltage wires from low-voltage wires.

FIG. 6 is an assembled perspective view of an assembly, generally indicated at 100, according to another embodiment of the invention. The assembly 100 includes a physical barrier 102 between high-voltage wires (which are assumed to be the set of input wires 26) and low-voltage wires (which are assumed to be the set of output wires 28). More specifically, the physical barrier 102 is carried by the spacer 104: the spacer 104 has a prong 106 that extends rearward from the front, between the two sets of wires 26, 28, and the physical barrier 102 extends vertically from the prong 106. The gang box 12 and driver 14 are unchanged relative to the embodiment described with respect to FIGS. 1-5.

In various implementations, the gang box 12 may be of a variety of different depths, depending on the nature of the electrical elements 16 that are to be secured in it. For that reason, the physical barrier 102 is divided by break lines 108 into a number of frangible sections 110. The physical barrier 102 may be made longer than the maximum expected depth of any gang box that might be used. During installation, frangible sections 110 may be broken away until the physical barrier 102 has the correct depth for the gang box 12.

As those of skill in the art will note, the physical barrier 102 is set back somewhat from the front of the gang box 12. This provides room for the electrical element 16 and its structure. Spacers 104 may be made with the physical barrier 102 set back to various depths.

The assemblies 10, 100 shown in FIGS. 1-6 have plastic gang boxes 12, plastic spacers 32, 104, and a plastic physical barrier 102. In other embodiments, these structures may be made of plastic or metal. For example, gang boxes made of metal may have thinner walls than comparable plastic structures. If these structures are made of plastic, the plastic may be required to have a particular flame rating, i.e., it may be required to exhibit particular behaviors when exposed to flame.

The assemblies 10, 100 of FIGS. 1-6 illustrate a situation in which the driver 14 protrudes through the bottom panel 20 of the gang box 10. As was described briefly above, the driver 14 may be seated in any panel of a gang box.

Figure 7:
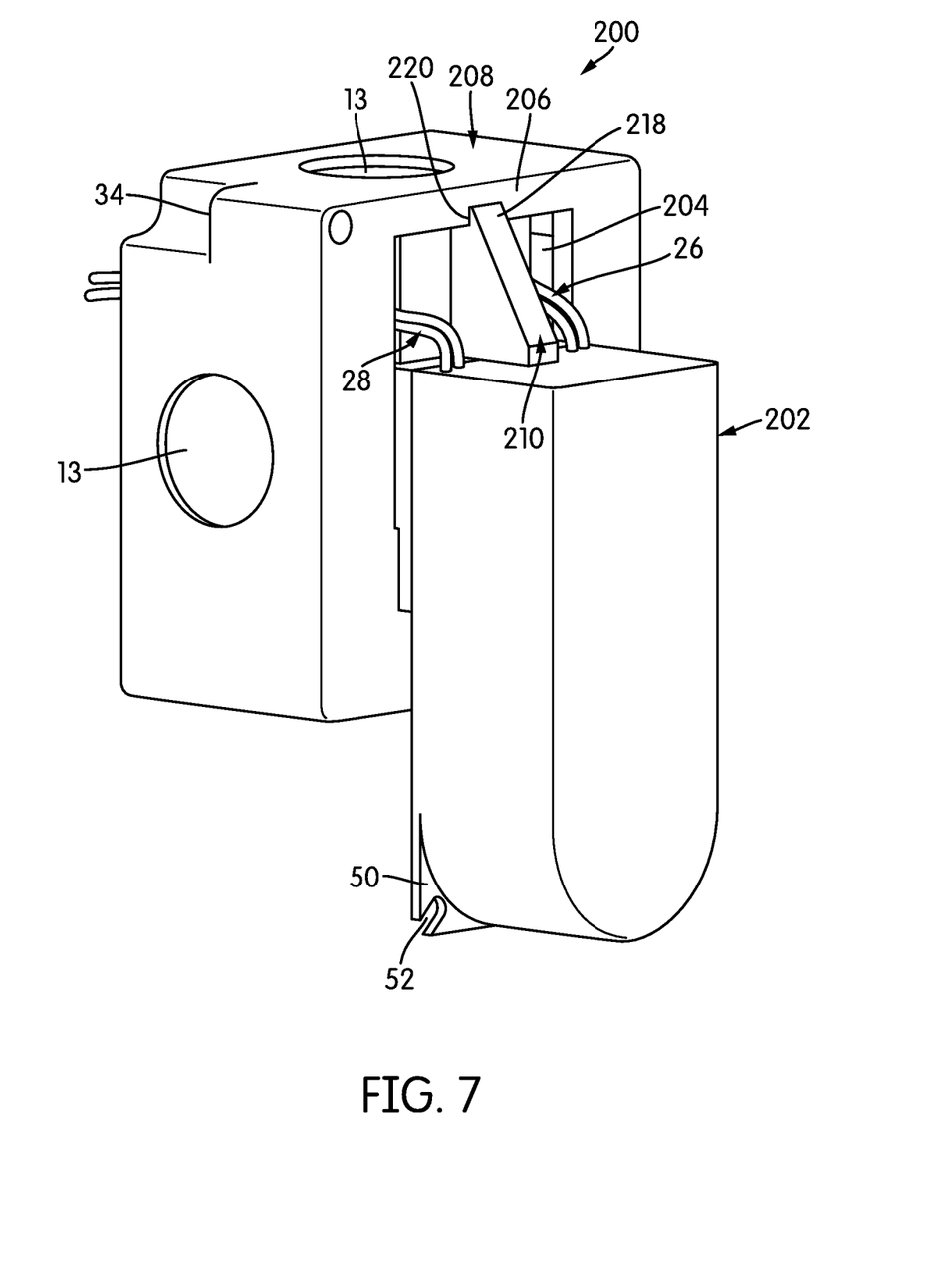
FIG. 7 is a rear perspective view of an assembly according to yet another embodiment of the invention.

FIG. 7 is a rear perspective view of an assembly, generally indicated at 200, according to another embodiment of the invention. In the embodiment of FIG. 7, the driver 202 is anchored within an opening 204 in the rear panel 206 of the gang box 208, although an opening like opening 204 could also be provided in either sidewall or the top panel.

The opening 204 is rectangular and, in the illustrated embodiment, positioned closer to the top of the rear panel 206 than the bottom. As with the opening 18, the gang box 208 may be manufactured with the opening 204, or a knock-out may be provided and the opening 204 made by removing the knock-out at the time of installation.

The driver 202 is fitted with an adapter 210 that extends along two of its faces. The extent of the adapter 210 is more visible in the front elevational view of FIG. 8 and in FIG. 9, a sectional view taken through Line 9-9 of FIG. 8. As can best be seen in the sectional view of FIG. 8, the adapter has an upper portion 212 and a lower portion 214. The lower portion 214 defines a channel 216 that hooks over and rests on the lower edge of the opening 204. The engagement of the channel 216 and the opening 204 may be sufficient to retain the driver 202 in engagement with the junction box 208 without any other structure.

The upper portion 212 provides additional securement and some measure of counterbalance for the forces and moments that may be created by the mass of the driver 202 and its position. As is visible in the view of FIG. 7, the upper portion 212 comprises a rib 218 that extends rearwardly, over the top face of the driver 202. A notch 220 abuts the upper edge of the opening 206. A forward projection 220 extends outwardly from the adapter 210 and projects into the gang box 208, abutting the interior face of the upper panel 224. In the illustrated embodiment, the forward projection 220 of the illustrated embodiment has the form of a wide, flat plate that is relatively thin, with left and right edges that are rounded to complement the internal features of the gang box 208. While the forward projection 220 may have other forms and extents in other embodiments, the form shown particularly in FIG. 8 serves the purpose of counterbalancing the driver 202 while leaving much of the interior volume of the gang box 208 open. Embodiments of the invention may leave, e.g., 75-90% or more of the interior volume of the gang box 208 free for insertion of electrical elements 16. In some cases, the issue may not be the volume of the gang box 208 that is left open, but instead the shape and extent of the components that enter the gang box 208. The shape of the forward projection 220, and any other components that enter the gang box 12, 208, may be adapted to suit specific types of electrical elements 16.

Figure 8:
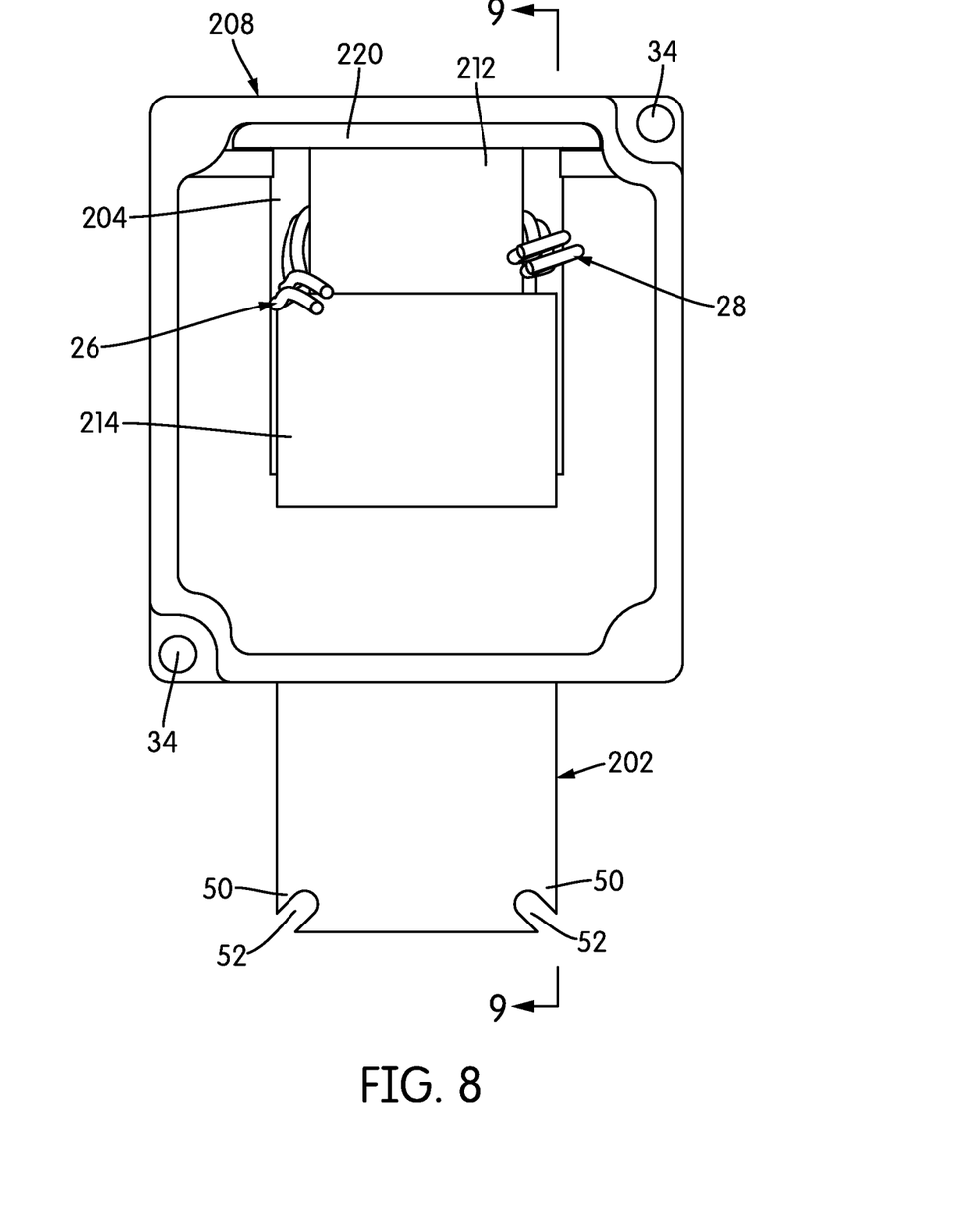
FIG. 8 is a front elevational view of the assembly of FIG. 7.

As can be seen in FIG. 8, both the upper portion 212 and the lower portion 214 are spaced from one another and are relatively wide and cover substantially the entirety of the width of the opening 204. This distributes the forces and moments over as wide an area as possible. The fit between the adapter 210 and the gang box 208 would generally be as tight as possible while still allowing the adapter 210 to be easily inserted into the gang box 208. In essence, the lower portion 214 mounts the driver 202 against gravity on the gang box 208, while the upper portion 212 secures it there.

Figure 9:
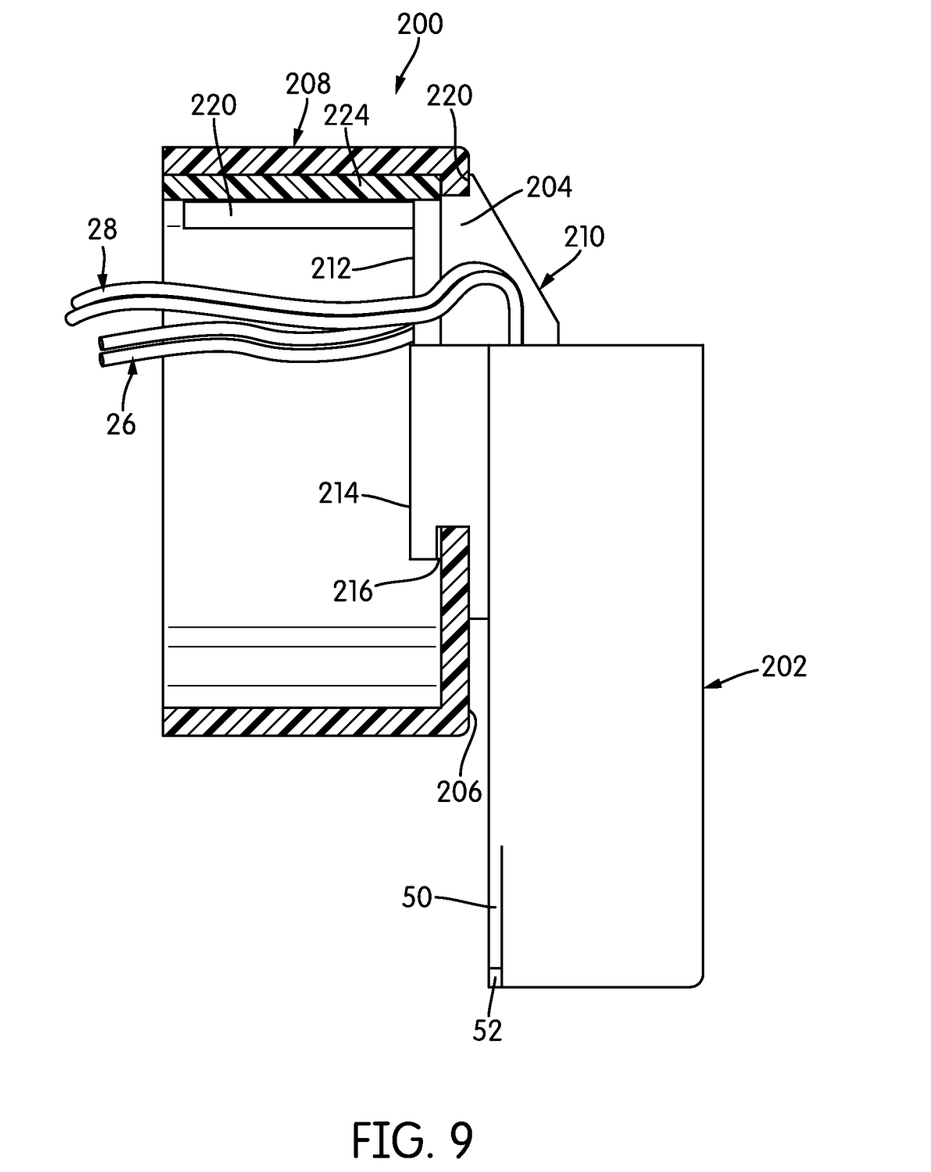
FIG. 9 is a sectional view taken through Line 9-9 of FIG. 8.

Although the adapter 210 of FIGS. 7-9 uses no fasteners, in some cases, fasteners could be used to provide additional securement, e.g., inserted through the lower portion 214 and the area around the opening 204. As with other embodiments, the adapter 210 is structured to keep as much of the interior volume of the junction box 208 open in order to accept an electrical element 16.

The structure of FIGS. 7-9 allows a driver 202 to be hung removably in an opening 204 of a gang box 208. One advantage of the mounting shown in this assembly 200 is that the driver 202 itself does not need to be inserted through the opening 204, which may allow for more variety in the types of drivers that can be used. As those of skill in the art will appreciate, a driver 14 with a flange 22 could be installed through a rear opening 204 in a gang box, and would extend directly rearward, cantilevered and held by the flange 22. If that is done, some additional form of securement, e.g. adhesives or fasteners, would be useful. The advantage of the adapter 210 is that it mounts and orients the driver 202 in such a way that gravity helps to hold the driver 202 in place.

Taken together, the assemblies 10, 200 illustrate a general point: a driver 14, 202 may be mounted in an opening in any wall of a gang box 12, 208. Mounted, the driver 14, 202 may be dropped in and extend through an opening, or it may be mounted such that it is completely outside of the gang box 12, 208, with only a flange 22, adapter 208, or other securing structure within the gang box 12, 208 itself.

Figure 10:
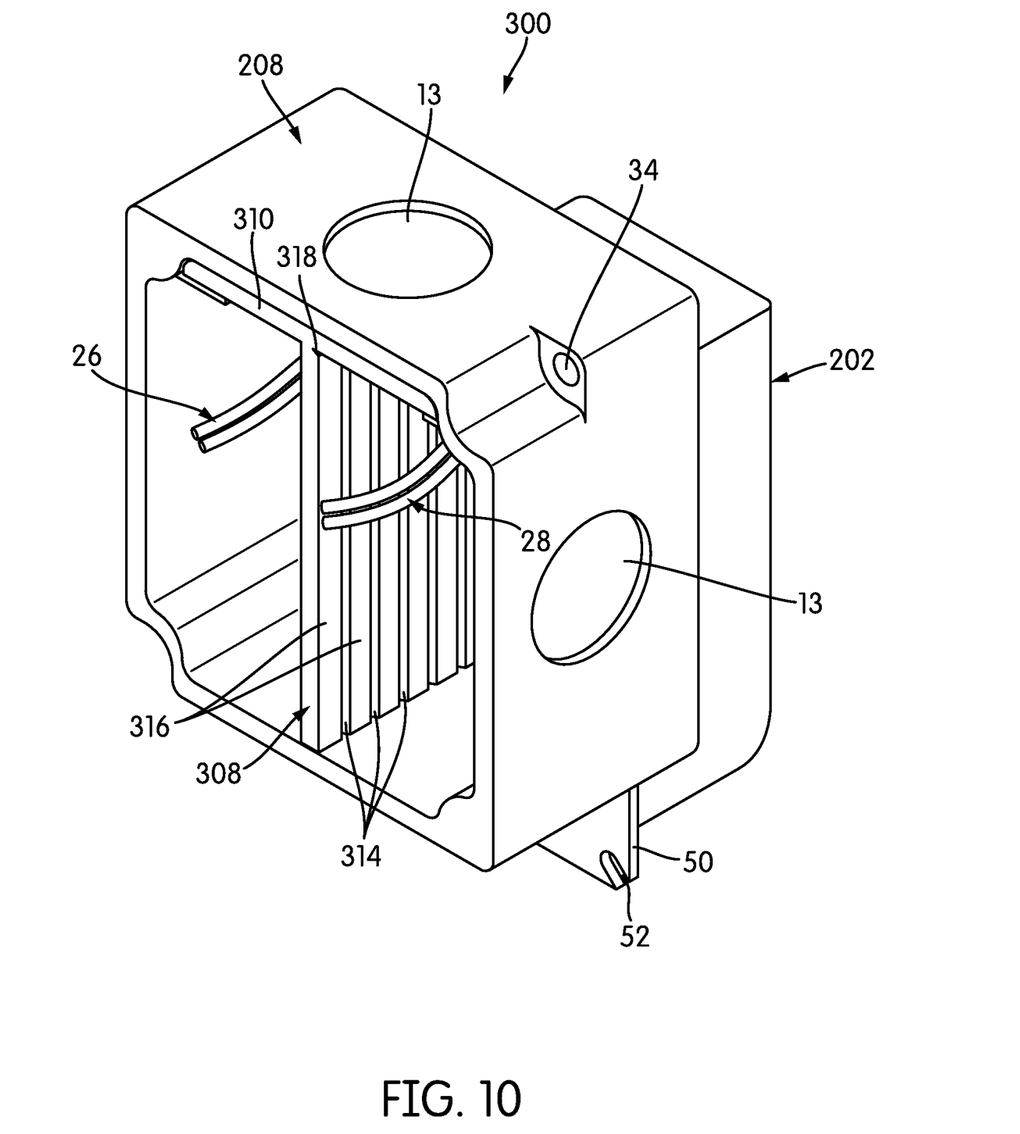
FIG. 10 is a perspective view of an assembly according to a further embodiment of the invention that includes a physical barrier to separate high-voltage wires from low-voltage wires.

As in the assembly 100 of FIG. 6, a rear-mount assembly 200 may sometimes require a physical barrier to separate high-voltage wires from low voltage wires. FIG. 10 is a perspective view of an assembly 300 according to yet another embodiment of the invention. In the assembly 300, an adapter (not shown in the figures, but having the same features as the adapter 210, except as specified below) is mounted to a driver 202, such that the driver 202 can be mounted along the rear panel of the gang box 208 through an opening 204.

A physical barrier 308 depends from the forward projection 310 of the adapter, extending along the depth of the gang box 208. In this case, the physical barrier 308 is centered in the gang box 208, but it may be offset to one side or the other in other embodiments. The physical barrier 308 is divided by break lines 314 into a number of frangible sections 316, so that the depth of the physical barrier 308 can be modified at the time of installation to accommodate the depth of the electrical element 16 by breaking off one or more of the frangible sections 316. A second break line 318 extends along the junction of the forward projection 310 and the physical barrier 308, allowing the frangible sections 316 to be broken off without affecting the forward projection 310 or its role in securing the driver 202.

While the physical barriers 102, 308 described here are vertically-extending, physical barriers may extend in any direction necessary—vertically, horizontally, diagonally, or in some cases, in several directions to make multiple compartments. Additionally, in some cases, the barrier may be a separate component that is inserted into slots or a channel in the gang box, or into slots, a groove, or a channel in the electrical element 16 itself. For example, the INFINILINE® driver-dimmer sold by Elemental LED, Inc. includes a horizontal groove in a rear surface that seats a rearwardly-extending physical barrier to separate low-voltage wiring from high-voltage wiring.

In some cases, a driver may be made with a flange 22, an adapter 210, or other such connecting structure, and may thus be particularly adapted for use in an assembly 10, 100, 200, 300. However, one advantage of assemblies 10, 100, 200, 300 according to embodiments of the invention is that drivers need not be manufactured specifically for them. Instead, any driver small enough to fit in the space can be retrofit with a flange 22, an adapter 202, or other such connecting structure for use in an assembly 10, 100, 200, 300. Retrofitting the driver with such structure may involve attaching a flange 22 or adapter 202 with adhesives, or it may involve, e.g., snap-fitting the parts on or around the driver. The adhesive may be pressure-sensitive adhesive, or it may be a traditionally-cured single part or multipart adhesive. In some cases, a flange intended for retrofitting may have a knock-out of its own to allow wires to pass through it. As a general matter, the shape of the flange 22 is not critical, so long as it is larger in at least one dimension than the opening with which it is intended to be used.

In fact, the drivers 14, 202 illustrated in the drawing figures are themselves retrofitted with a flange 22 or an adapter 210, respectively. Both drivers 14, 202 include corner flanges 50 with diagonal slots 52. The slots 52 are intended to secure the driver 14, 202 in a conventional manner and need not be used in embodiments of the present invention.

While many of the advantages of the assemblies 10, 100, 200, 300 described here are realized during the installation process, one particular advantage of the assemblies 10, 100, 200, 300 may be helpful after installation: as installed, the drivers 14, 202 can be easily removed and replaced if they fail, or if a different model or type of driver is required. For example, drivers are often rated to supply a particular wattage of power. If, for example, a lighting system is upgraded and more lighting is installed on the same circuit, a higher-wattage driver may be required.

Although some portions of this description may describe a complete assembly 10, 100, 200, 300 by which a driver 14, 202 is mounted in a gang box 12, 208, 312 with an electrical element 16. However, embodiments of the invention also encompassed the individual components. For example, a gang box with a knock-out for a driver opening, a driver with a flange or adapter, or an adapter configured to mount a driver to a gang box are all individually encompassed by embodiments of the present invention.

In the description above, the gang box 12, 208 is a single gang box—one advantage of embodiments of the invention is that a single gang box 12, 208 can fit both a driver 14, 202 and an electrical element 16. However, the principles described here are equally applicable to a multi-gang box. In a multi-gang box, a driver may be mounted in, mounted on, or associated with each compartment. Alternatively, a single driver may service multiple compartments. If a driver is to service multiple compartments, it may, for example, have one set of input wires and several sets of output wires.

Much of the above description assumes that the driver 14, 202 is too large to fit entirely within the gang box 12, 208 and still allow room for an electrical element 16. However, there are some drivers that could fit within a standard single-gang box. When one is using one of these drivers, the driver may have a volume small enough such that much of its volume could remain within the walls of the gang box. The structures and methods for securing and mounting drivers that are disclosed above may be used to secure small drivers that fit within the gang box. In some cases, these structures and methods may be adapted somewhat relative to what is described above. For example, a small driver may have a flange similar to the flange 22 described above, and the gang box may also carry flanges that establish an internal channel for a driver, like the flanges 30. Relative to what is shown in FIGS. 1-5, the driver could be flipped over, so that it is secured by the flanges 30 but extends into the gang box, instead of through the opening and outside of the gang box. In this example, an opening in the gang box may not be necessary. Alternatively, a small driver could be installed within a gang box using an adapter like the adapter 210, with the driver mounted on the inside of the gang box and the adapter extending outside of the gang box to mount and secure it. In other words, the orientation of components may be reversed relative to what is shown in the drawing figures if the intention is for the volume of the driver to extend within the gang box. Of course, with a small driver, it may not always be necessary to secure the driver using the kinds of structures disclosed above; instead, the presence and tight fit of an electrical element 16 may be sufficient to secure the driver.

Finally, although much of this description refers to a driver as the component being mounted in association with a junction box, other types of devices that need to be connected to or associated with the electrical elements that are typically mounted in a junction box may be used in assemblies according to embodiments of the invention. These devices may include smoke alarms, security devices (which may need to be connected to sensors that are mounted as electrical elements within gang boxes), wireless transceivers for building automation systems, HVAC sensors and controls, or any other such devices. Similarly, the load on the driver or device need not be an LED luminaire; instead, the load may be any device that requires power in a form different than that supplied by the building.

While the invention has been described with respect to certain embodiments, the description is intended to be exemplary, rather than limiting. Modifications and changes may be made within the scope of the invention, which is defined by the appended claims.

What is claimed is:

1. A gang box assembly, comprising:
   a gang box having
      a back,
      top, bottom, left, and right sidewalls arising from the back and extending forwardly therefrom,
      an opening, or a knock-out to define the opening, in the bottom sidewall, and
      a pair of flanges extending inwardly from the respective left and right sidewalls of the gang box, the pair of flanges being above the bottom sidewall such that a space is defined between the pair of flanges and the bottom sidewall, adjacent to the opening; and
   a spacer having first and second portions sized and arranged to fit under the flanges, and a cross-member that extends between the first and second portions, at least a substantial portion of an area bounded by the first and second portions and the cross-member being open.

2. The gang box assembly of claim 1, the spacer further comprising a third portion that carries a vertically-extending barrier.

3. The gang box assembly of claim 2, wherein the vertically-extending barrier has frangible portions.

4. The gang box assembly of claim 2, wherein the third portion extends from the cross-member.

5. The gang box assembly of claim 4, wherein the third portion extends in parallel to the first portion and the second portion.

6. A gang box assembly, comprising:
   a gang box having
      a back,
      top, bottom, left, and right sidewalls arising from the back and extending forwardly therefrom,
      an opening, or a knock-out to define the opening, in the bottom sidewall, and
      a pair of flanges extending inwardly from the respective left and right sidewalls of the gang box, the pair of flanges being above the bottom sidewall such that a space is defined between the pair of flanges and the bottom sidewall, adjacent to the opening;
   a spacer having first and second portions sized and arranged to fit under the flanges, and a cross-member that extends between the first and second portions, at least a substantial portion of an area bounded by the first and second portions and the cross-member being open; and
   a driver flange attached, or adapted to be attached, to a driver, the driver flange being larger than the opening in at least one dimension and being adapted to fit in the space defined between the pair of flanges and the bottom sidewall.

7. The gang box assembly of claim 6, the spacer further comprising a third portion that carries a vertically-extending barrier.

8. The gang box assembly of claim 7, wherein the vertically-extending barrier has frangible portions.

9. The gang box assembly of claim 7, wherein the third portion extends from the cross-member.

10. The gang box assembly of claim 9, wherein the third portion extends in parallel to the first portion and the second portion.

11. The gang box assembly of claim 6, wherein the driver flange fills and closes the opening.

12. The gang box assembly of claim 9, wherein the driver flange allows wires to pass into the gang box.

13. An assembly, comprising:
   a gang box having an opening, or a knock-out for the opening, in a rear wall of the gang box; and
   an adapter adapted to be attached to a driver, the adapter including a lower portion with a channel that is sized and adapted to rest over a lower edge of the opening and an upper portion, spaced from the lower portion, with engaging structure that is adapted to abut or engage an upper portion of the opening.

14. The assembly of claim 13, wherein the upper portion of the adapter further comprises a forward projection that is adapted to enter the gang box through the opening.

15. The assembly of claim 13, wherein the adapter is constructed and arranged to suspend the driver outside of the gang box.

* * * * *